United States Patent Office 2,698,332
Patented Dec. 28, 1954

2,698,332

ASPIRIN DERIVATIVE AND METHOD OF MAKING

Stewart M. Beekman, Berkeley Heights, N. J., assignor to Reheis Company, Inc., a corporation of New York No Drawing. Application April 20, 1951,
Serial No. 222,160

4 Claims. (Cl. 260—448)

This invention relates to an improved aspirin derivative and the method of making it. The invention relates particularly to an aspirin product of pronounced antacid properties and the method of making it without decomposition during the manufacture.

The desirability of decreasing the acidity of aspirin has long been recognized. Various salts have been suggested for the purpose, including basic aluminum acetylsalicylate in which two valences of the aluminum are taken by the radical of acetylsalicylic acid and the other valence by the hydroxyl group.

I have now discovered that an improved aspirin derivative results when at least two-thirds of the valences of aluminum in the finished product are satisfied by hydroxyl groups. I have also discovered a method of making the new antacid aspirin.

In attempts to make this more basic material, I encountered the difficulty that the product either does not form at all or, if formed, decomposes under usual conditions of manufacture for such materials. I developed finally a method that not only gives the highly basic aluminum salt desired but also eliminates the difficulty due to decomposition of the product.

Stated briefly, the invention comprises the herein described basic aluminum acetylsalicylate in which the proportion of hydroxyl groups associated with the aluminum are at least twice the number of acetylsalicylate groups and, in the preferred embodiment, such a basic salt in which the ratio of hydroxyl groups to acetylsalicylate radicals is 2–14 to 1.

The invention comprises, in addition, the method of manufacturing the basic aluminum salt of aspirin in which method solid hydrous alumina gel and solid acetylsalicylic acid are suspended in aqueous suspension and maintained in violent agitation at relatively low temperature. This causes reaction of the materials in contact with each other at temperatures below the decomposition point of the unstable product containing a plurality of hydroxyl groups.

Proceeding as described, I make a basic aluminum salt of aspirin which has the strong neutralizing effect long sought particularly for those persons in whom the acidity of conventional aspirin causes gastro-intestinal disturbances.

In effecting the violent mixing of the solid hydrous alumina gel and conventional aspirin, the latter being in finely divided form and both being suspended in water, I use to advantage a high speed agitator such as a Waring Blendor. In this machine, the particles of alumina gel and the aspirin are not only suspended but are rapidly rubbed or passed over the surfaces of each other. Reaction occurs.

I have found that the basic aluminum acetylsalicylate of the desired antacid properties is both made and preserved from objectionable decomposition when the conditions are as stated, the reactants are used in proportions required theoretically to provide at least two hydroxyl groups for each acetylsalicylate group, and the temperature of the mixture is maintained at or below about 65° C. at all times during the reaction. If the temperature is above 65° C. for an appreciable period of time, then there is decomposition that shows in the finished product. When the temperature is maintained at a maximum which is lower than 20° C., on the other hand, it is not feasible to obtain commercially satisfactory reaction of the reacting materials. I obtain desirable rates at 40° to 55°–65° C., without the hazard of incompleteness of reaction or the decomposition to which reference has been made.

As the acetylsalicylic acid used, I employ any commercial grade of aspirin. As introduced for agitation with the hydrous alumina gel, the aspirin should be powdered or in the form of very fine crystals as, for instance, of size of particles to pass to the extent of at least 90% by weight through a 40 to 100-mesh screen.

As the hydrous alumina gel, I use one that is gelatinous and is acid-reactive, as to 0.1 N hydrochloric acid. An especially reactive gel that I use to advantage is one made by alkali metal carbonate or bicarbonate precipitation from an aqueous solution of an aluminum salt. Such a product, after washing the precipitate of aluminum hydroxide with water retains some carbonate or bicarbonate ions or ions of both kinds.

Preparation of reactive alumina gel

More specifically, an acid reactive alumina gel is prepared as follows:

160.5 parts of light soda ash (99% $Na_2CO_3$) representing approximately 1.5 mols sodium carbonate and 254 parts of sodium bicarbonate (99% $NaHCO_3$) representing 3 mols are dissolved in 4700 parts of water. The resulting dilute alkali solution is filtered.

484 parts of crystalline aluminum chloride $AlCl_3.6H_2O$ (2 mols) are dissolved in 396 parts of water.

Precipitation of the hydrous alumina gel is effected by the gradual addition, with stirring, of the aluminum chloride solution to the dilute alkali solution. Addition of the aluminum chloride solution is stopped when a washed sample of the precipitated gel, after dispersion in distilled water, has a pH of about 6–7.5 and preferably about 6.5–7.

The precipitated slurry is filtered and the filter cake is washed with water. The washed cake weighs 1613 parts.

The wet alumina gel so produced contains 6.32% of aluminum calculated as the oxide $Al_2O_3$.

The acid reactivity of the alumina gel is determined as follows: 63.3 parts of the 6.32% gel made as described is dispersed with 36.7 parts of water, to yield 100 parts 4% $Al_2O_3$ gel.

In this (Reheis) method for determining acid reactivity, 12 ml. of the 4% $Al_2O_3$ gel are added to 100 ml. 0.1 N HCl at 37° C. with two drops Toepfer's reagent as indicator and shaken until the indicator changes color. The time required for a representative product made as described is 15 seconds. The indicator change shows that the gel at that time has neutralized the acid to the extent of raising the pH to the turning point of the indicator.

In an alternative (Mutch) method for acid reactivity 1.6 ml. 4% $Al_2O_3$ gel, equivalent to 0.1 g. $Al(OH)_3$, are added to 30 ml. 0.1 N HCl at 37° C. with two drops Toepfer's reagent. The whole is shaken until the indicator changes color. The time required for a typical alumina gel made as described above is 52 seconds, instead of 15 seconds by the Reheis method.

The invention is further illustrated by description in connection with the following specific examples of making the improved aspirin derivative, proportions here and elsewhere herein being expressed as parts by weight unless specifically stated to the contrary.

Example 1

One hundred and sixty-one parts of the hydrous alumina oxide gel, having an aluminum content calculated as $Al_2O_3$ of 6.32% and a reactivity of 0.1 N HCl of 52 seconds by the Mutch method, were introduced into a high speed mixer (Waring Blendor) with 200 parts distilled water and agitated for 5 minutes. The agitator had a 2-inch impellor and rotated at the rate of 11,000 R. P. M., a peripheral velocity of about 5700 feet a minute. The temperature rose from 22° to 30° C. 18.2 parts of U. S. P. acetylsalicylic acid (80-mesh powder) were then added and the agitation continued until the temperature reached 60° C.; this required an additional 21 minutes. The batch was then cooled to 50° C. with cold water in an external system. An additional 161 parts of the reactive alumina gel (6.32% $Al_2O_3$) was added and the agitation continued, with cooling as necessary to hold the temperature between 50° and 65° C., until the pH became practically constant. This required about 14 minutes' agitation. In this time the pH, which in the original mixture was 3.6, had risen to 5. The batch was then cooled to 30° C.

The reaction product was partially dewatered by filtration under suction. The filtration rate was slow, due to the finely divided nature of the solid. The filter cake weighed 204 parts.

The wet filter cake was dried in an air circulating oven at 43° C. The dried filter cake was soft and friable. It weighed 50.5 parts. It was ground to a finely divided powder by passage through a hammer mill with screen (Mikro sample mill).

The milled material was ready for tableting and distribution for use.

The product contained only 1 acetylsalicylate radical for 11 hydroxyl groups and 4 aluminum atoms. The formula may be written $Al_4(OH)_{11}(CH_3.CO.OC_6H_4.COO)$.

Example 2

The procedure of Example 1 was followed except that the amounts of the reactive alumina gel used in the two separate additions were each a half of the amounts used in Example 1.

This gives a product of the formula $$Al_2(OH)_5(CH_3CO.OC_6H_4.COO)$$

Example 3

The procedure of Example 1 was followed except that the amount of the reactive alumina gel used in the two separate additions were each a quarter of the amounts used in Example 1.

This gives a product of the formula $$Al(OH)_2(CH_3CO.OC_6H_4.COO)$$

Example 4

The procedure of Example 1 was followed except that the amount of the reactive alumina gel used in the two separate additions were each increased by 25% above the amounts used in Example 1.

This gives a product of the formula $$Al_5(OH)_{14}(CH_3.CO.OC_6H_4.COO)$$

Example 5

The procedure of Example 1 was followed except that the amount of reactive alumina gel used in the first addition was 121.00 parts and in the second addition was also 121.00 parts.

This gives the product $$Al_3(OH)_8(CH_3.CO.OC_6H_4.COO)$$

Example 6

The procedure of Example 1, 2, 3, 4, or 5 was followed except that the reactivity of the alumina gel to acid, as measured by the standard Reheis method described above, is any reactivity up to 40–60 seconds.

The products of the several examples may be dried in vacuo or spray-dried. When milled, they are powders.

The aspirin derivatives made as described have the desirable therapeutic properties of ordinary acetylsalicylic acid or aspirin. In addition, they have strong antacid action, two-thirds to fifteen-sixteenths of the 12 valences of the aluminium being accounted for by the basic (OH) groups.

These aspirin derivatives may be represented by the general formula $Al_x(OH)_{3x-1}(CH_3.CO.OC_6H_4.COO)$ in which $x$ is an integral number within the range 1 to 5. There is no point in a higher ratio of hydroxy groups to acetylsalicylic acid radicals than those shown in the formulas.

It will be understood that it is intended to cover all changes and modifications of the examples of the invention herein shown for the purpose of illustration which do not constitute departures from the spirit and scope of the invention.

What I claim is:

1. In making an aspirin derivative of pronounced antacid properties, in manner to introduce at least two hydroxyl groups for each acetylsalicylate group in the final derivative and to prevent decomposition of the derivative as formed, the method which comprises forming an aqueous suspension of acid reactive hydrous alumina gel and acetylsalicylic acid in proportion not exceeding about 1 mol of the said acid for 1 atom of aluminum in the gel, vigorously agitating the resulting suspension, so as to effect frequent contact and reaction of the suspended gel and acetylsalicylic acid, continuing the contact of the said gel and acid until the pH of the resulting mixture becomes substantially constant, and then separating the insoluble derivative so produced from the remaining liquid phase.

2. The method of claim 1 in which the said gel and acid are maintained at all times during the reaction at a temperature not in excess of about 65° C.

3. The method of claim 1 in which the alumina gel has an acid reactivity of not more than 60 seconds as measured by the standard Reheis method.

4. The method of claim 1 in which the alumina gel has an acid reactivity of not more than 10 minutes as measured by the Mutch method.

References Cited in the file of this patent

UNITED STATES PATENTS

| Number | Name | Date |
|---|---|---|
| 1,447,501 | Altwegg | Mar. 6, 1923 |
| 1,967,649 | Wolf | July 24, 1934 |

FOREIGN PATENTS

| Number | Country | Date |
|---|---|---|
| 569,946 | Germany | Jan. 19, 1933 |